(12) United States Patent
Bush et al.

(10) Patent No.: US 9,296,036 B2
(45) Date of Patent: Mar. 29, 2016

(54) METHODS FOR PRODUCING FORGED PRODUCTS AND OTHER WORKED PRODUCTS

(71) Applicant: ALCOA INC., Pittsburgh, PA (US)

(72) Inventors: Dustin M. Bush, Avon Lake, OH (US); Eric V. Roegner, Hudson, OH (US); Edward L. Colvin, Newport, VA (US); Larry N. Mueller, Solon, OH (US); Roberto J. Rioja, Murrysville, PA (US); Brandon Hendrickson Bodily, Broadview Heights, OH (US)

(73) Assignee: Alcoa Inc., Pittsburgh, PA (US)

( * ) Notice: Subject to any disclaimer, the term of this patent is extended or adjusted under 35 U.S.C. 154(b) by 0 days.

(21) Appl. No.: 14/327,218

(22) Filed: Jul. 9, 2014

(65) Prior Publication Data
US 2015/0013144 A1    Jan. 15, 2015

Related U.S. Application Data

(60) Provisional application No. 61/844,744, filed on Jul. 10, 2013, provisional application No. 61/845,260, filed on Jul. 11, 2013, provisional application No. 61/895,046, filed on Oct. 24, 2013, provisional application No. 61/913,077, filed on Dec. 6, 2013, provisional application No. 61/955,027, filed on Mar. 18, 2014.

(51) Int. Cl.
*B21J 5/02* (2006.01)
*C22F 1/18* (2006.01)
(Continued)

(52) U.S. Cl.
CPC .. *B21J 5/02* (2013.01); *B21J 1/003* (2013.01); *B21J 1/06* (2013.01); *C22F 1/18* (2013.01); *C22F 1/183* (2013.01); *C23C 4/005* (2013.01); *C23C 4/01* (2016.01); *C23C 4/08* (2013.01); *C23C 4/12* (2013.01); *F01D 5/28* (2013.01); *F05D 2230/31* (2013.01); *F05D 2300/174* (2013.01); *Y10T 29/4998* (2015.01)

(58) Field of Classification Search
CPC .............................. B21J 5/02; Y10T 29/4998
See application file for complete search history.

(56) References Cited

U.S. PATENT DOCUMENTS 4,055,975 A    11/1977    Serfozo
4,294,615 A    10/1981    Blackburn et al.
(Continued)

FOREIGN PATENT DOCUMENTS

WO    WO2010/049696    5/2010
WO    WO2012/065729    5/2012
WO    WO2013/087515    6/2013

OTHER PUBLICATIONS

Bass, B. S., "Validating the Arcam EBM Process as an Alternative Fabrication Method for Titanium—6Al—4V Alloys", pp. 1-51, Thesis, Dept. of Materials Science and Engineering, North Carolina State University, Raleigh, North Carolina, 2007.
(Continued)

*Primary Examiner* — Moshe Wilensky
(74) *Attorney, Agent, or Firm* — Greenberg Traurig, LLP

(57) ABSTRACT

Methods for producing forged products and other worked products are disclosed. In one embodiment, a method comprises using additive manufacturing to produce a metal shaped-preform and, after the using step, forging the metal shaped-preform into a final forged product. The final forged product may optionally be annealed.

13 Claims, 9 Drawing Sheets

(51) Int. Cl.
*F01D 5/28* (2006.01)
*C23C 4/12* (2006.01)
*C23C 4/00* (2006.01)
*C23C 4/08* (2006.01)
*B21J 1/00* (2006.01)
*B21J 1/06* (2006.01)

(56) References Cited

U.S. PATENT DOCUMENTS

| | | | |
|---|---|---|---|
| 5,102,451 A * | 4/1992 | Abkowitz | C22C 1/0458 |
| | | | 420/417 |
| 5,622,216 A | 4/1997 | Brown | |
| 6,127,044 A * | 10/2000 | Yamamoto et al. | 428/603 |
| 6,519,500 B1 | 2/2003 | White | |
| 7,087,109 B2 | 8/2006 | Bredt et al. | |
| 8,017,070 B2 | 9/2011 | Low et al. | |
| 8,240,046 B2 | 8/2012 | Peretti et al. | |
| 8,394,168 B2 | 3/2013 | Withers et al. | |
| 2004/0084118 A1 | 5/2004 | Raymond et al. | |
| 2004/0244887 A1 * | 12/2004 | Fukai et al. | 148/670 |
| 2006/0065330 A1 | 3/2006 | Cooper et al. | |
| 2007/0023975 A1 | 2/2007 | Buckley | |
| 2007/0089815 A1 * | 4/2007 | Wickersham et al. | 148/668 |
| 2007/0118243 A1 | 5/2007 | Schroeder et al. | |
| 2010/0242843 A | 9/2010 | Peretti et al. | |
| 2010/0279007 A1 | 11/2010 | Briselden et al. | |
| 2010/0291401 A1 * | 11/2010 | Medina et al. | 428/593 |
| 2011/0042859 A1 | 2/2011 | Patel et al. | |
| 2011/0097213 A1 | 4/2011 | Peretti et al. | |
| 2011/0135952 A1 | 6/2011 | Morris et al. | |
| 2011/0183030 A1 | 7/2011 | Belzile et al. | |
| 2011/0241947 A1 | 10/2011 | Scott et al. | |
| 2013/0039799 A1 | 2/2013 | Bono et al. | |
| 2013/0071562 A1 | 3/2013 | Szuromi et al. | |

OTHER PUBLICATIONS

Brice, C. A., et al., "Additive Manufacturing Workshop," presented at the Commonwealth Scientific and Industrial Research Organisation, Melbourne, Australia, Jun. 27, 2011.

Jayakumar, A., "Why the aerospace industry is investing in 3-D printing", The Washington Post, Jun. 2014, downloaded from the Internet on Jun. 19, 2014 at http://www.washingtonpost.com/business/capitalbusiness/why-the-aerospace-industry-is-investing-in- . . . .

Martina, F. et al., "Improved Microstructure and Increased Mechanical Properties of Additive Manufacture Produced Ti—6Al—4V by Interpass Cold Rolling", pp. 490-496, in 24th International Freeform Fabrication Symposium, Austin, Texas, 2013.

Nannan, G. et al., "Additive manufacturing: technology, applications and research needs", abstract only, Frontiers of Mechanical Engineering, publisher SP Higher Education Press, May 2013.

Slattery et al., "Evaluation of Arcam Deposited Ti—6Al—4V", 2nd SAIAS Symposium, Stellenbosch, South Africa, Sep. 2008.

Taminger, K. M., et al., "Electron Beam Freeform Fabrication for Cost Effective Near-Net Shape Manufacturing", pp. 16-1-16-10, Metals & Thermal Structures Branch, NASA Langley Research Center, Hampton, VA, NASA Technical Reports Server, May 2006.

Warwick, G., "Just getting started: Additive manufacturing drive new revolution", Aviation Week & Space Technology, p. 22, Nov. 2013.

Wooten, J., et al,, "Electron Beam Melting Manufacturing for Production Hardware" publisher SAE International, 2008.

AMS 4999A, "Titanium Alloy Direct Deposited Products—6Al-4V Annealed", SAE Aerospace, pp. 1-12, Issued Feb. 2002, Revised Sep. 2011.

International Search Report and Written Opinion dated Oct. 31, 2014, from corresponding co-owned International Application No. PCT/US2014/045952.

Standard, ASTM "F2792-12a (2012) Standard terminology for additive manufacturing technologies, ASTM International, West Conshohocken, PA, doi: 10.1520/F2792-12A."

Boyer, R. R., "Titanium and Titanium Alloys", *Metals Handbook Ninth Edition, vol. 9 Metallography and Microstructures*, ASM, Metals Park, Ohio, pp. 458-475, Dec. 1985.

Gaspar, B., "Microstructural Characterization of Ti—6Al—4V and its Relationship to Sample Geometry", Materials Engineering Dept., Cal Poly State University—San Luis Obispo, California, Jun. 2012.

Kobryn, P. A., et al., "The Laser Additive Manufacture of Ti—6Al—4V", *JOM*, pp. 40-42, Sep. 2001.

Pedersen, R. "Microstructure and phase transformation of Ti—6Al—4V", Licentiate Thesis, Lulea University of Technology, Dept. of Applied Physics and Mechanical Engineering Materials, pp. 1-31 and appended papers I-II, May 2002.

Sears, J. W., et al., "Applications in Direct Metal Laser Manufacturing", LAM Laser Additive Manufacturing Workshop, Western Illinois University, Quad City Manufacturing Laboratory, Feb, 29-Mar. 1, 2012.

"Titanium Alloy Ti 6Al—4V", Alloy Data Sheet, pp. 1-10, CRS Holdings Inc., a subsidiary of Carpenter Technology Corporation, Jul. 2000.

* cited by examiner

METHODS FOR PRODUCING FORGED PRODUCTS AND OTHER WORKED PRODUCTS

CROSS-REFERENCE TO RELATED APPLICATIONS

This patent application claims priority to U.S. Provisional Patent Application No. 61/844,744, filed Jul. 10, 2013, and claims priority to U.S. Provisional Patent Application No. 61/845,260, filed Jul. 11, 2013, and claims priority to U.S. Provisional Patent Application No. 61/895,046, filed Oct. 24, 2013, and claims priority to U.S. Provisional Patent Application No. 61/913,077, filed Dec. 6, 2013, and claims priority to U.S. Provisional Patent Application No. 61/955,027, filed Mar. 18, 2014. Each of these applications is incorporated by reference in their entirety herein.

BACKGROUND

Metal products may be formed into shapes via forging operations. To forge metal products, several successive dies (flat dies and/or differently shaped dies) may be used for each part, with the flat die or the die cavity in a first of the dies being designed to deform the forging stock to a first shape defined by the configuration of that particular die, and with the next die being shaped to perform a next successive step in the forging deformation of the stock, and so on, until the final die ultimately gives the forged part a fully deformed shape. See, U.S. Pat. No. 4,055,975.

SUMMARY

Broadly, the present patent application relates to improved methods for producing worked metal products (e.g., forged metal products; other types of hot worked and/or cold worked metal products).

In one embodiment, a method includes using additive manufacturing to produce a metal shaped-preform. After the using step, the metal shaped-preform may be forged into a final forged product. In one embodiment, the forging step comprises a single die forging step. In one embodiment, the metal preform comprises at least one of titanium, aluminum, nickel, steel, and stainless steel. In one embodiment, the metal shaped-preform may be a titanium alloy. For example, the metal shaped-preform may comprise a Ti-6Al-4V alloy. In another embodiment, the metal shaped-preform may be an aluminum alloy. In yet another embodiment, the metal shaped-preform may be a nickel alloy. In yet another embodiment, the metal shaped-preform may be one of a steel and a stainless steel. In another embodiment, the metal shaped-preform may be a metal matrix composite. In yet another embodiment, the metal shaped-preform may comprise titanium aluminide. For example, in one embodiment, the titanium alloy may include at least 48 wt. % Ti and at least one titanium aluminide phase, wherein the at least one titanium aluminide phase is selected from the group consisting of $Ti_3Al$, TiAl and combinations thereof. In another embodiment, the titanium alloy includes at least 49 wt. % Ti. In yet another embodiment, the titanium alloy includes at least 50 wt. % Ti. In another embodiment, the titanium alloy includes 5-49 wt. % aluminum. In yet another embodiment, the titanium alloy includes 30-49 wt. % aluminum, and the titanium alloy comprises at least some TiAl. In yet another embodiment, the titanium alloy includes 5-30 wt. % aluminum, and the titanium alloy comprises at least some $Ti_3Al$.

The forging step may comprise heating the metal shaped-preform to a stock temperature, and contacting the metal shaped-preform with a forging die. In one embodiment, when the contacting step is initiated, the forging die may be a temperature that is at least 10° F. lower than the stock temperature. In another embodiment, when the contacting step is initiated, the forging die is a temperature that is at least 25° F. lower than the stock temperature. In yet another embodiment, when the contacting step is initiated, the forging die is a temperature that is at least 50° F. lower than the stock temperature. In another embodiment, when the contacting step is initiated, the forging die is a temperature that is at least 100° F. lower than the stock temperature. In yet another embodiment, when the contacting step is initiated, the forging die is a temperature that is at least 200° F. lower than the stock temperature.

In one aspect, the final forged product is a component for an engine. In one embodiment, the final forged product is a blade for a jet engine. In another embodiment, as described below, the final forged product is an engine containment ring.

In another aspect, a method may comprise using additive manufacturing to produce a metal shaped-preform, and concomitant to, or after the using step, working the metal shaped-preform into a final worked product via at least one of: (i) rolling, (ii) ring rolling, (iii) ring forging, (iv) shaped rolling, (v) extruding, and (vi) combinations thereof. In one embodiment, the working is rolling. In another embodiment, the working is ring rolling. In yet another embodiment; the working is ring forging. In another embodiment, the working is shaped rolling. In yet another embodiment, the working is extruding.

When the metal shaped-preform comprises a Ti-6Al-4V alloy, the forging step may comprise heating the metal shaped-preform to a stock temperature, and contacting the metal shaped-preform with a forging die. In this regard, the contacting step may comprise deforming the metal shaped-preform via the forging die. In one embodiment, the contacting step comprises deforming the metal shaped-preform via the forging die to realize a true strain of from 0.05 to 1.10 in the metal shaped-preform. In another embodiment, the contacting step comprises deforming the metal shaped-preform via the forging die to realize a true strain of at least 0.10 in the metal shaped-preform. In yet another embodiment, the contacting step comprises deforming the metal shaped-preform via the forging die to realize a true strain of at least 0.20 in the metal shaped-preform. In another embodiment, the contacting step comprises deforming the metal shaped-preform via the forging die to realize a true strain of at least 0.25 in the metal shaped-preform. In yet another embodiment, the contacting step comprises deforming the metal shaped-preform via the forging die to realize a true strain of at least 0.30 in the metal shaped-preform. In another embodiment, the contacting step comprises deforming the metal shaped-preform via the forging die to realize a true strain of at least 0.35 in the metal shaped-preform. In another embodiment, the contacting step comprises deforming the metal shaped-preform via the forging die to realize a true strain of not greater than 1.00 in the metal shaped-preform. In yet another embodiment, the contacting step comprises deforming the metal shaped-preform via the forging die to realize a true strain of not greater than 0.90 in the metal shaped-preform. In another embodiment, the contacting step comprises deforming the metal shaped-preform via the forging die to realize a true strain of not greater than 0.80 in the metal shaped-preform. In yet another embodiment, the contacting step comprises deforming the metal shaped-preform via the forging die to realize a true strain of not greater than 0.70 in the metal shaped-preform. In another embodiment, the contacting step comprises deforming the metal shaped-preform via the forging die to realize a true strain of not greater than 0.60 in the metal shaped-preform. In yet another embodiment, the contacting step comprises deforming the metal shaped-preform via the forging die to realize a true strain of not greater than 0.50 in the metal shaped-preform. In another embodiment, the contacting step comprises deforming the metal shaped-preform via the forging die to realize a true strain of not greater than 0.45 in the metal shaped-preform. As mentioned above, the forging step may comprise heating the metal shaped-preform to a stock temperature.

In one aspect, the forging step may comprise heating the metal-shaped preform to a stock temperature. In one approach, the metal shaped preform is heated to a stock temperature of from 850° C. to 978° C. In one embodiment, the metal shaped preform is heated to a stock temperature of at least 900° C. In another embodiment, the metal shaped preform is heated to a stock temperature of at least 950° C. In yet another embodiment, the metal shaped preform is heated to a stock temperature of at least 960° C. In another embodiment, the metal shaped preform is heated to a stock temperature of not greater than 975° C. In yet another embodiment, the metal shaped preform is heated to a stock temperature of not greater than 973° C.

In one aspect, the step of using additive manufacturing to produce a metal shaped-preform may comprise adding material, via additive manufacturing, to a building substrate thereby producing the metal shaped-preform. In one embodiment, the material is a first material having a first strength and wherein the building substrate is comprised of a second material having a second strength. The first material may have a first fatigue property and the second material may have a second fatigue property. For example, a layer of a first material having low strength and high toughness could be added, via additive manufacturing, to a building substrate comprised of a second material having high strength and low toughness, thereby producing a metal-shaped preform useful, for example, in ballistic applications.

In one embodiment, the building substrate comprises a first ring of a first material, and the using step comprises adding a second material, via additive manufacturing, to the first ring thereby forming a second ring, wherein the second ring is integral with the first ring.

In another aspect, the method may include, after the forging step, annealing the final forged product. In one embodiment, when the metal shaped-preform comprises a Ti-6Al-4V alloy, the annealing step may comprise heating the final forged product to a temperature of from about 640° C. to about 816° C. In another embodiment, when the metal shaped-preform comprises a Ti-6Al-4V alloy, the annealing step may comprise heating the final forged product to a temperature of from about 670° C. to about 750° C. In yet another embodiment, when the metal shaped-preform comprises a Ti-6Al-4V alloy, the annealing step may comprise heating the final forged product to a temperature of from about 700° C. to about 740° C. In another embodiment, when the metal shaped-preform comprises a Ti-6Al-4V alloy, the annealing step may comprise heating the final forged product to a temperature of about 732° C.

DETAILED DESCRIPTION

Reference will now be made in detail to the accompanying drawings, which at least assist in illustrating various pertinent embodiments of the new technology provided for by the present disclosure.

Figure 1:
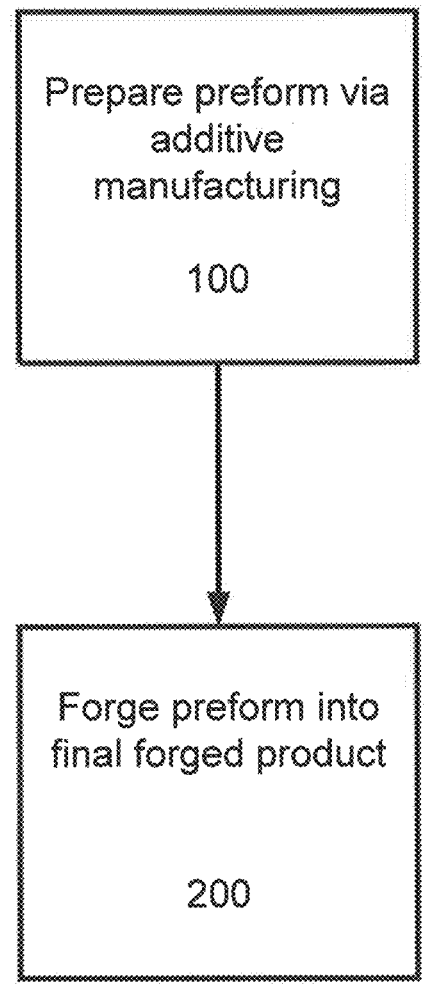
FIG. 1 is a schematic illustration of one embodiment of a method of producing 4 final forged product.

One embodiment of the new method for producing forged metal products is illustrated in FIG. 1. In the illustrated embodiment, the method includes a step of preparing (100) a metal shaped-preform via additive manufacturing, followed by forging (200) the metal shaped-preform into a final forged product (e.g., a net-shape product or near net-shape product). After the forging step (200), the final forged product may require no additional machining or other processing steps, thus facilitating a lower total cost of manufacturing. Furthermore, the final forged product may realize improved properties (e.g., relative to a pure additively manufactured component).

The additive manufacturing step (100) prepares the metal shaped-preform. Additive manufacturing, or 3-D printing, is a process where layers of a material are deposited one after another using digital printing techniques. Thus, precisely designed products can be produced. The metal shaped-preform produced by the additive manufacturing step (100) may be made from any metal suited for both additive manufacturing and forging, including, for example metals or alloys of titanium, aluminum, nickel (e.g., INCONEL), steel, and stainless steel, among others. An alloy of titanium is an alloy having titanium as the predominant alloying element. An alloy of aluminum is an alloy having aluminum as the predominant alloying element. An alloy of nickel is an alloy having nickel as the predominant alloying element. An alloy of steel is an alloy having iron as the predominant alloying element, and at least some carbon. An alloy of stainless steel is an alloy having iron as the predominant alloying element, at least some carbon, and at least some chromium. In one embodiment, the metal shaped-preform is an intermediate product in the form of a precursor to a blade for a jet engine.

Still referring to FIG. 1, once the metal shaped-preform is formed, the metal shaped-preform is forged (200). In one embodiment, the forging step (200) uses a single blocker to die forge the metal shaped-preform into the final forged product. By forging (200) the metal shaped-preform, the final forged product may realize improved properties, such as improved porosity (e.g., less porosity), improved surface roughness (e.g., less surface roughness, i.e., a smoother surface), and/or better mechanical properties (e.g., improved surface hardness), among others.

Figure 2:
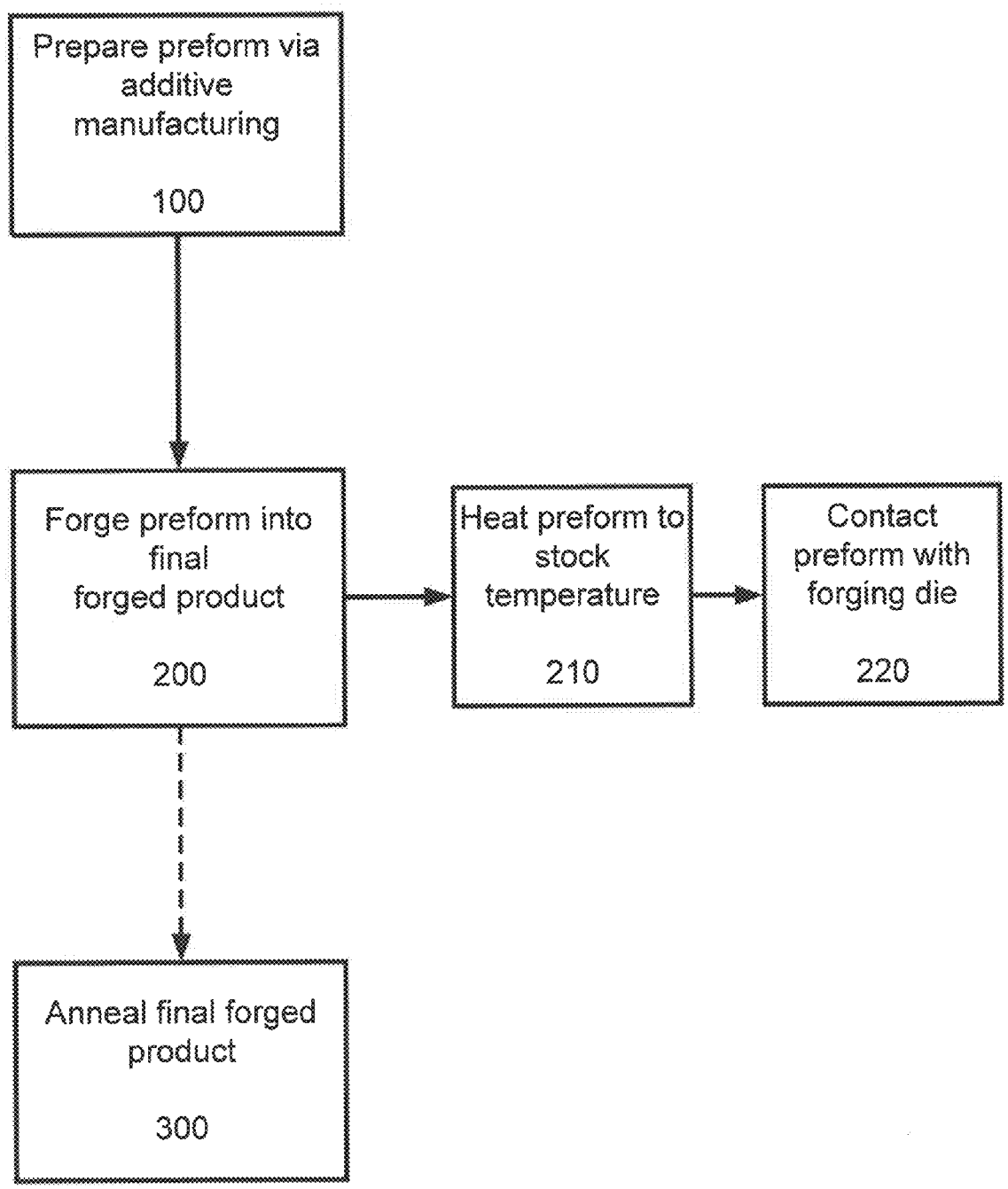
FIG. 2 is a schematic illustration of one embodiment of a method of producing a final forged product, wherein the method includes an optional annealing step.

Referring now to FIG. 2, in one embodiment, during the forging step (200), the dies and/or tooling of the forging process is at a lower temperature than the metal-shaped preform. In this regard, the forging step may include heating the metal shaped-preform to a stock temperature (the target temperature of the preform prior to the forging) (210), and contacting the metal shaped-preform with a forging die (220). In one embodiment, when the contacting step (220) is initiated, the forging die is a temperature that is at least 10° F. lower than the stock temperature. In another embodiment, when the contacting step (220) is initiated, the forging die is a temperature that is at least 25° F. lower than the stock temperature. In yet another embodiment, when the contacting step (220) is initiated, the forging die is a temperature that is at least 50° F. lower than the stock temperature. In another embodiment, when the contacting step (220) is initiated, the forging die is a temperature that is at least 100° F. lower than the stock temperature. In yet another embodiment, when the contacting step (220) is initiated, the forging die is a temperature that is at least 200° F. lower than the stock temperature. In another embodiment, when the contacting step (220) is initiated, the forging die is a temperature that is at least 300° F. lower than the stock temperature. In yet another embodiment, when the contacting step (220) is initiated, the forging die is a temperature that is at least 400° F. lower than the stock temperature. In another embodiment, when the contacting step (220) is initiated, the forging die is a temperature that is at least 500° F. lower than the stock temperature.

In one aspect, after the forging step (200) the final forged product may optionally be annealed (300). The annealing step (300) may facilitate the relieving of residual stress in the metal-shaped preform due to the forging step (200). In one approach, the metal-shaped preform comprises a Ti-6Al-4V alloy and the annealing step (300) may comprise heating the final forged product to a temperature of from about 640° C. (1184° F.) to about 816° C. (1500° F.) and for a time of from about 0.5 hour to about 5 hours. In one embodiment, the annealing step (300) may comprise heating the final forged product to a temperature of at least about 640° C. (1184° F.). In another embodiment, the annealing step (300) may comprise heating the final forged product to a temperature of at least about 670° C. (1238° F.). In yet another embodiment, the annealing step (300) may comprise heating the final forged product to a temperature of at least about 700° C. (1292° F.). In another embodiment, the annealing step (300) may comprise heating the final forged product to a temperature of not greater than about 760° C. (1400° F.). In yet another embodiment, the annealing step (300) may comprise heating the final forged product to a temperature of not greater than about 750° C. (1382° F.). In another embodiment, the annealing step (300) may comprise heating the final forged product to a temperature of not greater than about 740° C. (1364° F.). In yet another embodiment, the time is at least about 1 hour. In another embodiment, the time is at least about 2 hours. In yet another embodiment, the time is not greater than about 4 hours. In another embodiment, the time is not greater than about 3 hours. In yet another embodiment, the annealing step (300) may comprise heating the final forged product to a temperature of about 732° C. (1350° F.) and for a time of about 2 hours.

The contacting step (220) may comprise applying a sufficient force to the metal shaped-preform via the forging die to realize a pre-selected amount of true strain in the metal shaped-preform. In one embodiment, the applying a sufficient force step comprises deforming the metal shaped-preform via the forging die. As used herein "true strain" ($\epsilon_{true}$) is given by the formula:

$$\epsilon_{true} = \ln(L/L_0)$$

Where $L_0$ is initial length of the material and L is the final length of the material. In one embodiment, the contacting step (220) may comprise applying sufficient force to the metal shaped-preform via the forging die to realize a true strain of from about 0.05 to about 1.10 in the metal shaped-preform. In another embodiment, the contacting step (220) may comprise applying sufficient force to the metal shaped-preform via the forging die to realize a true strain of at least 0.10 in the metal shaped-preform. In another embodiment, the contacting step (220) may comprise applying sufficient force to the metal shaped-preform via the forging die to realize a true strain of at least 0.20 in the metal shaped-preform. In yet another embodiment, the contacting step (220) may comprise applying sufficient force to the metal shaped-preform via the forging die to realize a true strain of at least 0.25 in the metal shaped-preform. In another embodiment, the contacting step (220) may comprise applying sufficient force to the metal shaped-preform via the forging die to realize a true strain of at least 0.30 in the metal shaped-preform. In yet another embodiment, the contacting step (220) may comprise applying sufficient force to the metal shaped-preform via the forging die to realize a true strain of at least 0.35 in the metal shaped-preform. In another embodiment, the contacting step (220) may comprise applying sufficient force to the metal shaped-preform via the forging die to realize a true strain of not greater than 1.00 in the metal shaped-preform. In yet another embodiment, the contacting step (220) may comprise applying sufficient force to the metal shaped-preform via the forging die to realize a true strain of not greater than 0.90 in the metal shaped-preform. In another embodiment, the contacting step (220) may comprise applying sufficient force to the metal shaped-preform via the forging die to realize a true strain of not greater than 0.80 in the metal shaped-preform. In yet another embodiment, the contacting step (220) may comprise applying sufficient force to the metal shaped-preform via the forging die to realize a true strain of not greater than 0.70 in the metal shaped-preform. In another embodiment, the contacting step (220) may comprise applying sufficient force to the metal shaped-preform via the forging die to realize a true strain of not greater than 0.60 in the metal shaped-preform. In yet another embodiment, the contacting step (220) may comprise applying sufficient force to the metal shaped-preform via the forging die to realize a true strain of not greater than 0.50 in the metal shaped-preform. In another embodiment, the contacting step (220) may comprise applying sufficient force to the metal shaped-preform via the forging die to realize a true strain of not greater than 0.45 in the metal shaped-preform. In yet another embodiment, the contacting step (220) may comprise applying sufficient force to the metal shaped-preform via the forging die to realize a true strain of about 0.40 in the metal shaped-preform.

In one embodiment, the metal shaped-preform is a low ductility material, such as a metal matrix composite or an intermetallic material. In one embodiment, the metal shaped-preform is titanium aluminide. Using the new processes disclosed herein may facilitate more economical production of final forged products from such low ductility materials. For instance, the low ductility materials may be forged using dies and/or tooling that are at a lower temperature than the low ductility material. Thus, in one embodiment, the forging is absent of isothermal forging (i.e., the forging process does not include isothermal forging), and thus can include any of the stock temperature versus die temperature differentials noted in the above-paragraph.

In one aspect, the metal shaped preform is a titanium (Ti) alloy, and thus includes titanium as the predominant alloying element. In one embodiment, a titanium alloy includes at least 48 wt. % Ti. In another embodiment, a titanium alloy includes at least 49 wt. % Ti. In yet another embodiment, a titanium alloy includes at least 50 wt. % Ti. In one embodiment, the titanium alloy comprises one or more titanium aluminide phases. In one embodiment, the titanium aluminide phase(s) is/are one or more of $Ti_3Al$ and TiAl. When titanium aluminides are present, the titanium alloy may include 5-49 wt. % aluminum. In one embodiment, the titanium aluminide phase(s) comprise TiAl. In one embodiment, the titanium alloy includes 30-49 wt. % aluminum, and the titanium alloy comprises at least some TiAl. In one embodiment, the titanium aluminide phase(s) comprises $Ti_3Al$. In one embodiment, the titanium alloy includes 5-30 wt. % aluminum, and the titanium alloy comprises at least some $Ti_3Al$. In one embodiment, the titanium alloy comprises aluminum and vanadium.

In one embodiment, the metal shaped preform comprises a Ti-6Al-4V alloy (a titanium alloy having about 6 wt. % aluminum and about 4 wt. % vanadium). In this regard, the Ti-6Al-4V preforms may be heated to a stock temperature of from about 850° C. (1562° F.) to about 978° C. (1792° F.). In one embodiment, the Ti-6Al-4V preforms may be heated to a stock temperature of at least 900° C. (1652° F.). In another embodiment, the Ti-6Al-4V preforms may be heated to a stock temperature of at least 925° C. (1697° F.). In another embodiment, the Ti-6Al-4V preforms may be heated to a stock temperature of at least 950° C. (1742° F.). In yet another embodiment, the Ti-6Al-4V preforms may be heated to a stock temperature of at least 960° C. (1760° F.). In another embodiment, the Ti-6Al-4V preforms may be heated to a stock temperature of not greater than 975° C. (1787° F.). In yet another embodiment, the Ti-6Al-4V preforms may be heated to a stock temperature of not greater than 973° C. (1783° F.).

The final forged product may be used in the aerospace, aviation, or medical industries, for example. The final forged product could be, for example, a turbine or blade. In one embodiment, the final forged product is a blade for a jet engine.

As mentioned above, after the additive manufacturing step (100), the metal shaped-preform may be forged (200) to create a final forged product. In other embodiments, after the additive manufacturing step (100), the metal shaped-preform may be processed via other forms of working (e.g., hot working) to create a final worked product. For instance, the working of the metal shaped-preform may also or alternatively include rolling, ring rolling, ring forging, shaped rolling, and/or extruding to create the final worked product. In some embodiments, the final worked product may realize improved properties, such as improved porosity (e.g., less porosity), improved surface roughness (e.g., less surface roughness, i.e., a smoother surface), and/or better mechanical properties (e.g., improved surface hardness), among others. In some embodiments, the final worked product may realize a predetermined shape. In some embodiments, the metal shaped-preform may be ring rolled, ring forged and/or extruded (e.g., forced through a die) to create a hollow final worked product. In some embodiments, the metal shaped-preform may be rolled to produce a final worked product that realizes improved porosity. In some embodiments, the metal shaped-preform may be shape rolled to produce a final worked product that realizes a predetermined shape (e.g., a curve having a specified radius).

As used herein, "ring rolling" means the process of rolling a ring of smaller diameter (e.g., a first ring having a first diameter) into a ring of larger diameter (e.g, a second ring having a second diameter, wherein the second diameter is larger than the first diameter), optionally with a modified cross section (e.g., a cross sectional area of the second ring is different than a cross sectional area of the first ring) by the use of two rotating rollers, one placed in the inside diameter of the ring and the second directly opposite the first on the outside diameter of the ring. As used herein, "ring forging" means the process of forging a ring of smaller diameter (e.g., a first ring having a first diameter) into a ring of larger diameter (e.g, a second ring having a second diameter, wherein the second diameter is larger than the first diameter), optionally with a modified cross section (e.g., a cross sectional area of the second ring is different than a cross sectional area of the first ring) by squeezing the ring between two tools or dies, one on the inside diameter and one directly opposite on the outside diameter of the ring. As used herein, "shaped rolling" means the process of shaping or forming by working the piece (i.e., the metal shaped-preform) between two or more rollers, which may or may not be profiled, to impart a curvature or shape to the work piece (i.e., the metal shaped-preform).

Figure 5:
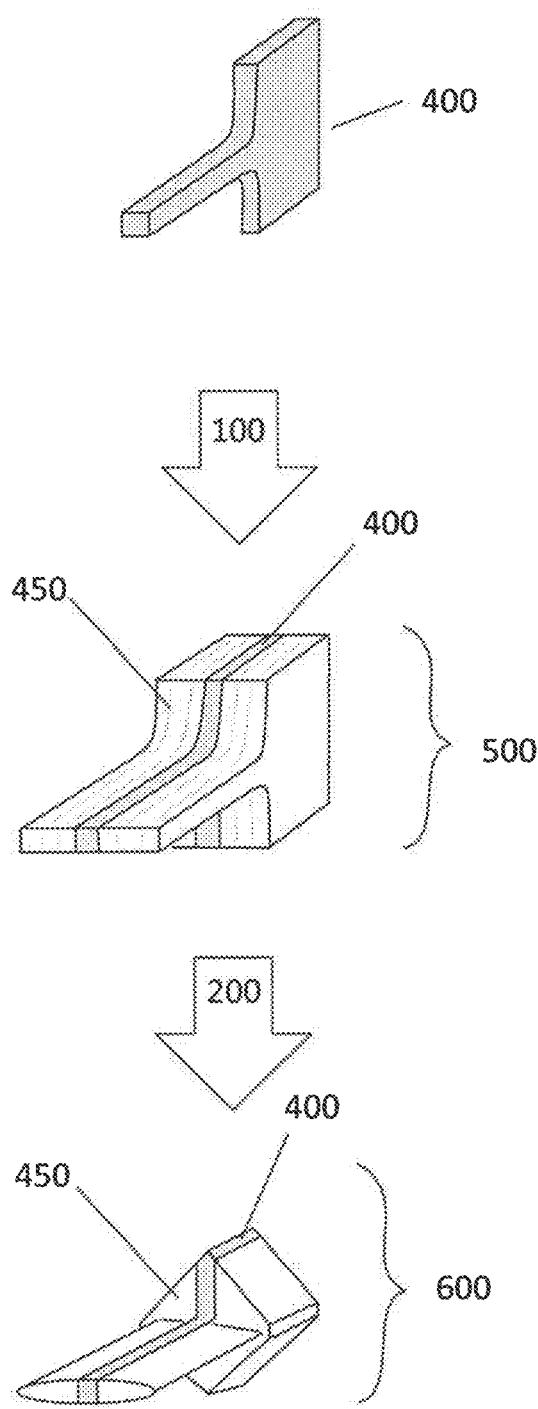
FIG. 5 is a schematic illustration of one embodiment of a method of producing a final forged product, wherein the final forged product includes an integral building substrate.

The step of preparing the metal shaped-preform via additive manufacturing (100) may include incorporating a building substrate into the metal shaped-preform. Referring now to FIG. 5, one embodiment of incorporating a building substrate (400) into the metal shaped-preform (500) is shown. In the illustrated embodiment, material (450) is added to a building substrate (400) via additive manufacturing (100) to produce the metal shaped-preform (500). As used herein, "building substrate" and the like means a solid material which may be incorporated into a metal shaped-preform. The metal shaped-preform (500), which includes the building substrate (400), may be forged (200) into a final forged product (600). Thus, the final forged product (600) may include the building substrate (400) as an integral piece.

As mentioned above, a final forged product may realize an amount (e.g., a pre-selected amount) of true strain due to the contacting step 220. In some embodiments, the strain realized by the final forged product may be non-uniform throughout the final forged product due to, for example, the shape of the forging dies and/or the shape of the metal shaped-preform. Thus, the final forged product may realize areas of low and/or high strain. Accordingly, the building substrate may be located in a predetermined area of the metal shaped-preform such that after the forging, the building substrate is located in a predetermined area of low strain of the final forged product. An area of low strain may be predetermined based on predictive modeling or empirical testing.

Figure 6:
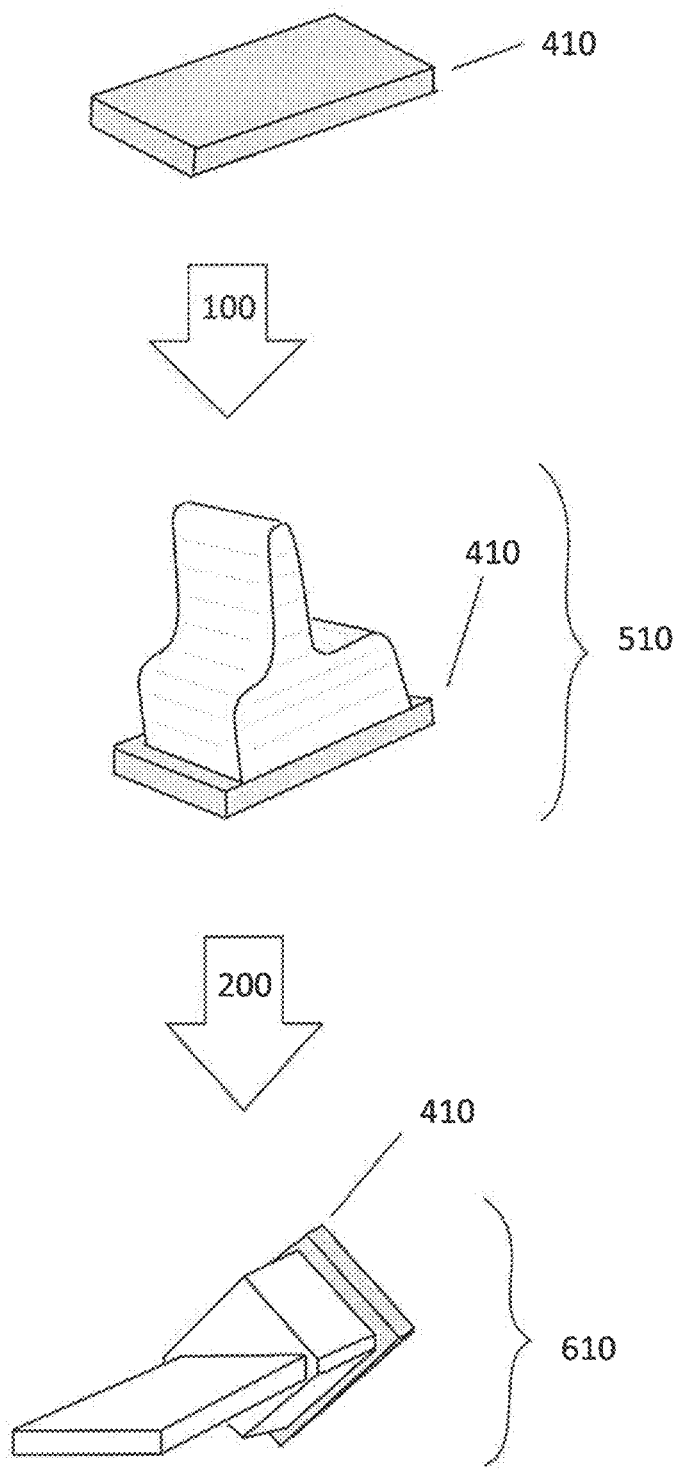
FIG. 6 is a schematic illustration of another embodiment of a method of producing a final forged product, wherein the final forged product includes an integral building substrate.

Referring now to FIG. 6, another embodiment of incorporating a building substrate (410) into a metal shaped-preform (510) is shown. In the illustrated embodiment, material is added to the building substrate (410) via additive manufacturing (100) to produce the metal shaped-preform (510). The metal shaped-preform (510) may be forged (200) into a final forged product (610). The final forged product (610) includes the building substrate (410) as an integral piece.

The building substrate may have a predetermined shape and/or predetermined mechanical properties (e.g., strength, toughness to name a few). In one embodiment, the building substrate may be a pre-wrought base plate. In one embodiment, the shape of the building substrate may be predetermined based on the shape of the area of low strain. In one embodiment, the mechanical properties of the building substrate may be predetermined based on the average true strain realized by the metal shaped-preform and/or the true strain realized within the area of low strain. In one embodiment, two or more building substrates may be incorporated into a metal-shaped preform. In one embodiment, the building substrate comprises a pre-wrought base plate.

The building substrate may be made from any metal suited for both additive manufacturing and forging, including, for example metals or alloys of titanium, aluminum, nickel (e.g., INCONEL), steel, and stainless steel, among others. In one embodiment, the building substrate is made of the same material(s) as the rest of the metal-shaped preform. In one embodiment, the material added to the metal shaped preform may be a first material, whereas the building substrate may be made of a second material. In one embodiment, the first material may have a first strength and the second material may have a second strength. In one embodiment, the first material may have a first fatigue property and the second material may have a second fatigue property. In one example, the building substrate may be a first ring of a first material. A second material may be added, via additive manufacturing, to the ring thereby forming a second ring of the second material, integral with the first ring. Thus a ring-shaped metal shaped-preform comprising two different materials may be produced. The ring-shaped metal shaped-preform may then be forged into a ring-shaped final forged product comprising two different materials. In one embodiment, one or more engine containment rings (e.g., one or more aerospace engine containment rings) may be formed by the method described above. For example the building substrate may comprise a first ring of a material which realizes high toughness. A second ring of a second material which realizes high strength may be added, via additive manufacturing, to the first ring thereby forming a metal shaped-preform. The metal shaped-preform may then be forged into an engine containment ring having an inner ring of high toughness and outer ring of high strength.

Example 1

Ti-6Al-4V

Figure 3:
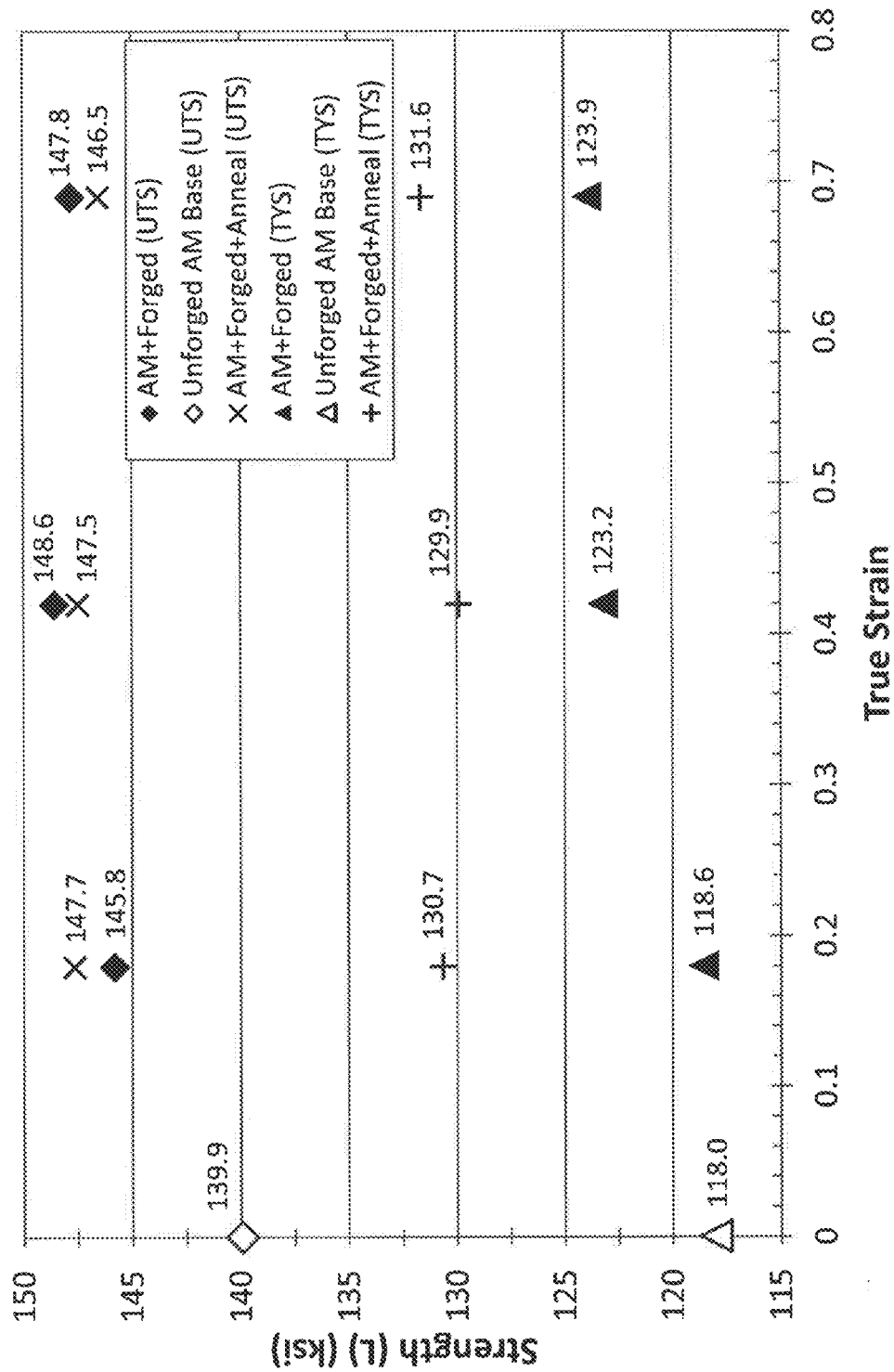
FIGS. 3-4 are charts illustrating data of Example 1.
Figure 4:
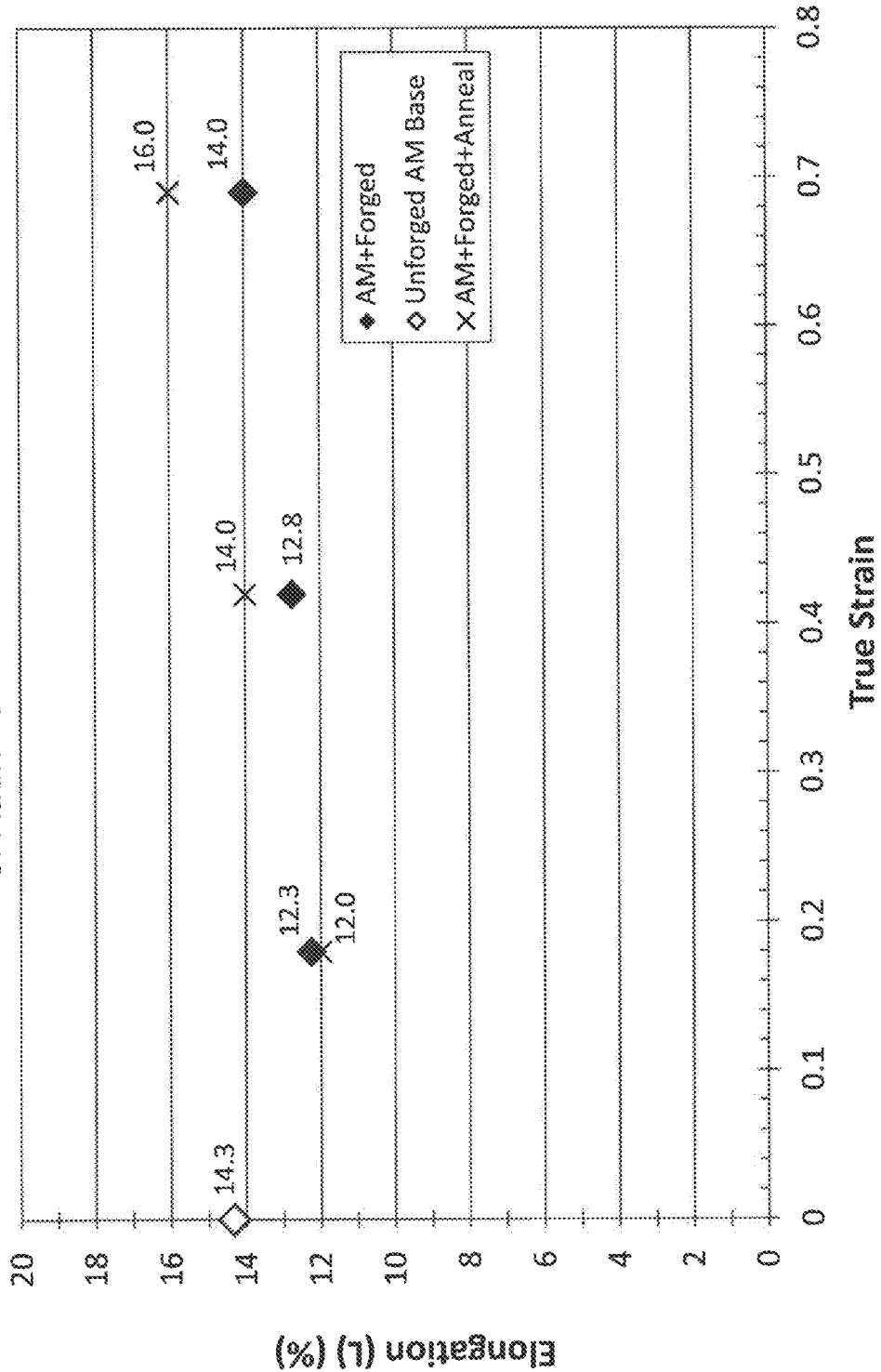

Several Ti-6Al-4V preforms are produced via additive manufacturing. Specifically cylindrical Ti-6Al-4V preforms were produced via an EOSINT M 280 Direct Metal Laser Sintering (DMLS) additive manufacturing system, available from EOS GmbH (Robert-Stirling-Ring 1, 82152 Krailling/Munich, Germany). The Ti-6Al-4V preforms were produced in accordance with the manufacturer's standard recommended operating conditions for titanium. The preforms were then heated to a stock temperature of about 958° C. (1756° F.) or about 972° C. (1782° F.). Next, some of the cylindrical preforms were forged under various amounts of true strain and using a die temperature of about 390° C.-400° C. (734° F.-752° F.) to produce cylindrical final forged products. The true strain was applied to the cylindrical preforms in a direction parallel to the axis of the cylinders. The remaining preforms were left unforged. Some of the final forged products were then annealed at a temperature of about 732° C. (1350° F.) for approximately two hours to produce annealed final forged products. Mechanical properties of the unforged preforms, the final forged products, and the annealed final forged products were then tested, including tensile yield strength (TYS), ultimate tensile strength (UTS) and elongation, all in the L direction, the results of which are shown in FIGS. 3-4. For each level of strain, several samples were tested and the results were averaged. Mechanical properties, including TYS, UTS, and elongation were tested in accordance with ASTM E8.

As shown, the forged Ti-6Al-4V products achieved improved properties over the unforged Ti-6Al-4V preforms. Specifically, and with reference to FIG. 3, the forged Ti-6Al-4V products achieved improved ultimate tensile strength (UTS) over the unforged Ti-6Al-4V preforms. For example, the unforged Ti-6Al-4V preforms achieved a UTS of about 140 ksi. In contrast, the forged Ti-6Al-4V products achieved improved ultimate tensile strength, realizing a UTS of about 149 ksi after being forged to a true strain of about 0.4. Furthermore, and as shown in FIG. 3, the forged Ti-6Al-4V products achieved improved tensile yield strength (TYS) over the unforged Ti-6Al-4V preforms. For example, the unforged Ti-6Al-4V preforms achieved a TYS of about 118 ksi. In contrast, the forged Ti-6Al-4V products achieved improved tensile yield strength, realizing a TYS of about 123 ksi after being forged to a true strain of about 0.4. As shown in FIG. 4, the forged Ti-6Al-4V products achieved good elongation, all achieving an elongation of above 12% after being forged.

Furthermore, the annealed final forged products achieved improved properties over the final forged products which were not annealed. Specifically, and with reference to FIG. 3, the annealed final forged products achieved improved tensile yield strength (TYS) over the non-annealed final forged products. For example the annealed final forged products which were forged to a true strain of about 0.2 achieved a TYS approximately 10% higher than the final forged products which were not annealed. Furthermore, and as shown in FIG. 3, the annealed final forged products achieved similar ultimate tensile strength (UTS) to the non-annealed final forged products. Thus, annealing the final forged products increased TYS without sacrificing UTS. As shown in FIG. 4, the annealed final forged products achieved improved elongation compared to the non-annealed final forged products.

Figure 7:
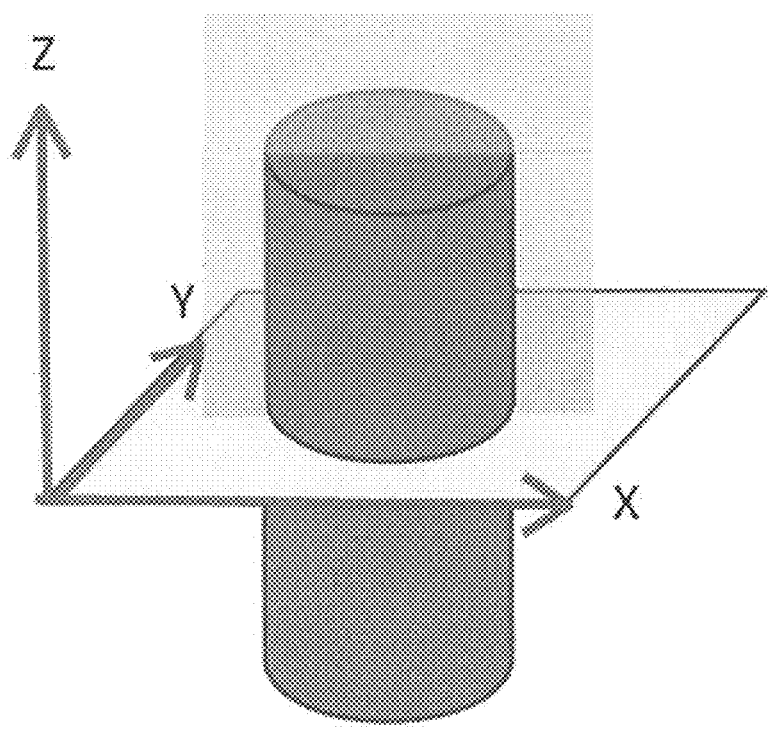
FIG. 7 is an illustration showing the transverse orientation and longitudinal orientations of a cylindrical preform.
Figure 8:
FIG. 8 is a micrograph of one embodiment of an as-built Ti-6Al-4V metal shaped-preform, taken in the transverse direction.
Figure 9:
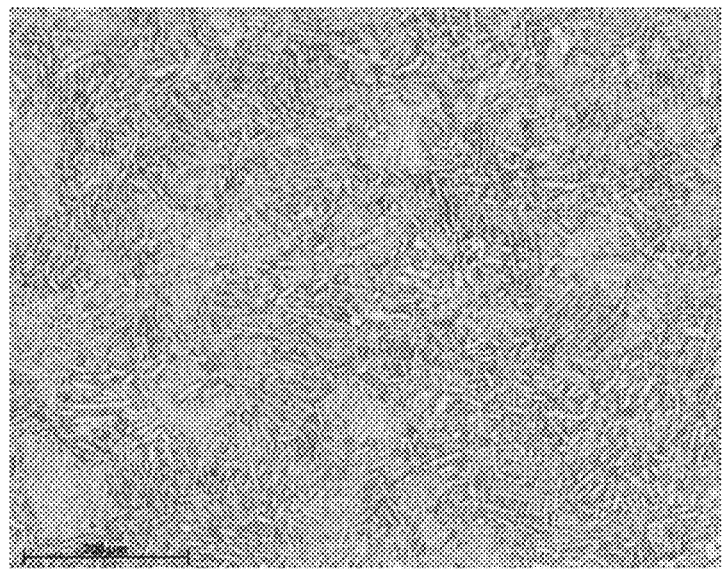
FIG. 9 is a micrograph of one embodiment of a preheated Ti-6Al-4V metal shaped-preform, taken in the transverse direction.
Figure 10:
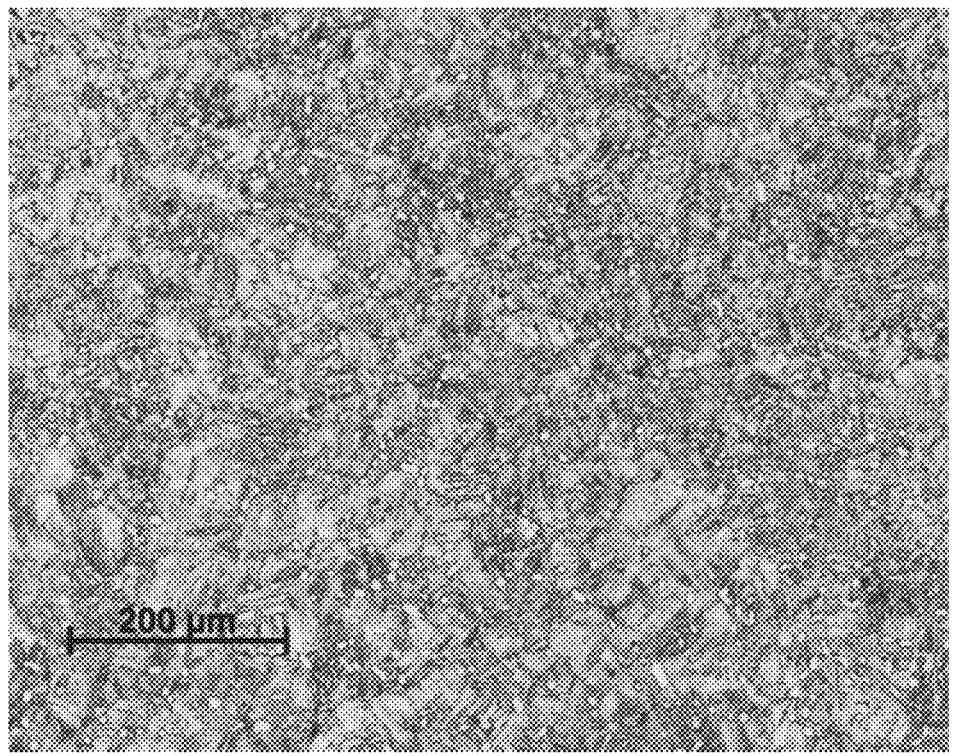
FIG. 10 is a micrograph of one embodiment of a Ti-6Al-4V final forged product, taken in the transverse direction.
Figure 11:
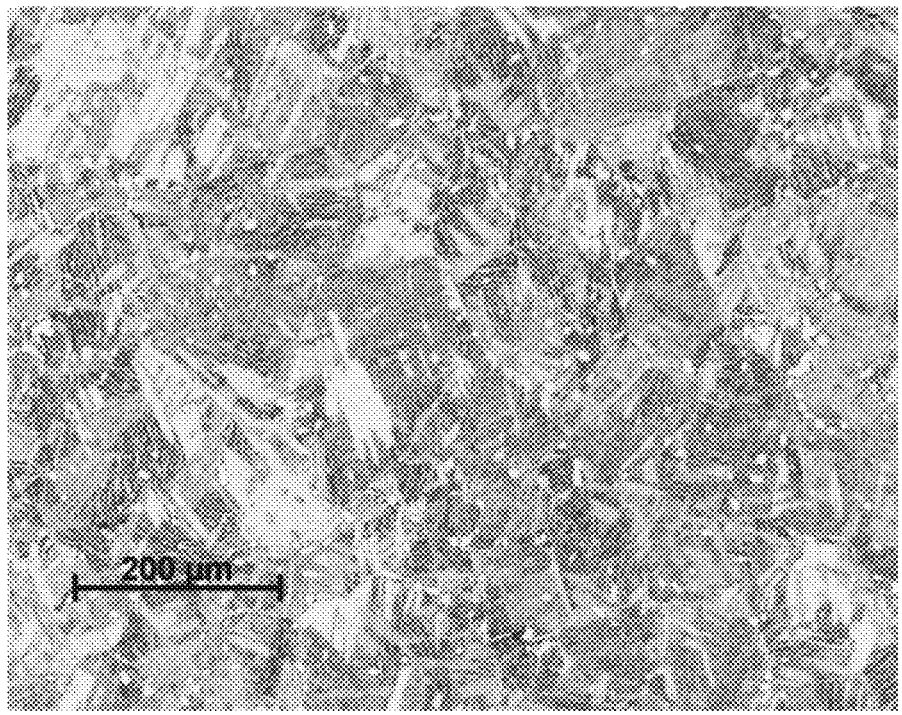
FIG. 11 is a micrograph of one embodiment of an annealed Ti-6Al-4V final forged product, taken in the transverse direction.

FIGS. 8-11 are micrographs showing the microstructures of the cylindrical preforms and cylindrical final forged products of Example 1. All of the micrographs were taken in the transverse orientation and at the midpoint of the cylinder. Referring now to FIG. 7, one embodiment of a cylindrical final forged product is illustrated. In the illustrated embodiment, the final forged product has been forged in the Z direction. The X-Y plane shown in FIG. 7 is the transverse orientation and the X-Z plane is the longitudinal orientation. Referring back to FIG. 8, a micrograph of a Ti-6Al-4V preform produced via additive manufacturing is shown. As can be seen in FIG. 8, the microstructure consists of transformed beta phase material with evidence of the prior beta phase grains. FIG. 9 is a micrograph of a additively manufactured Ti-6Al-4V preform that has been preheated to a temperature of about 1750° F. As can be seen in FIG. 9, the microstructure after heating is transformed beta phase material with the formation and growth of acicular alpha phase material. No primary alpha phase material is observed. FIG. 10 is a micrograph of an additively manufactured Ti-6Al-4V preform that has been preheated to a temperature of about 1750° F. and then forged to true strain of about 0.7 (e.g., a final forged product). As can be seen in FIG. 10 the preheating and forging steps result in a more refined grain structure, punctuated by the nucleation of primary alpha phase grains interspersed in the matrix. These interspersed primary alpha phase grains are observed as the small, white, circular dots. FIG. 11 is a micrograph of an additively manufactured Ti-6Al-4V preform that has been preheated to a temperature of about 1750° F., then forged to true strain of about 0.7, and then annealed at a temperature of about 1350° F. (e.g., an annealed final forged product). As can be seen in FIG. 11, in addition to the small, circular grains of primary alpha phase material interspersed in the matrix, primary grains of alpha phase material have formed as well.

While various embodiments of the present disclosure have been described in detail, it is apparent that modification and adaptations of those embodiments will occur to those skilled in the art. However, it is to be expressly understood that such modifications and adaptations are within the spirit and scope of the present disclosure.

What is claimed is:

1. A method compromising:
    (a) using additive manufacturing to produce a metal shaped-preform, wherein the metal shaped-preform comprises a titanium alloy, wherein the additive manufacturing comprises:
    depositing layers of a first material on an upper side of a building substrate; and
    depositing layers of a second material on a opposing lower side of the building substrate;
    wherein at least one of the first material, the second material, and the building substrate comprises the titanium alloy;
    (b) after the using step (a), forging the metal shaped-preform, with the building substrate therein, into a final forged product having the building substrate therein.

2. The method of claim 1, wherein the forging step comprises a single die forging step, wherein the single die forging step is using a single blocker die to die forge the metal-shaped preform into the final forged product.

3. The method of claim 1, wherein at least one of the first material, the second material, or the building substrate of the metal shaped-preform comprises titanium aluminide.

4. The method of claim 1, wherein the forging step comprises:
    heating the metal shaped-preform to a stock temperature; and
    contacting the metal shaped-preform with a forging die, wherein, when the contacting step is initiated, the forging die is a temperature that is at least 10° F. lower than the stock temperature.

5. The method of claim 1, wherein the final forged product is a blade for a jet engine.

6. The method of claim 1, wherein the titanium alloy includes at least 50 wt. % Ti and at least one titanium aluminide phase, wherein the at least one titanium aluminide phase is selected from the group consisting of $Ti_3Al$, TiAl and combinations thereof.

7. The method of claim 6, wherein the titanium alloy includes 5-30 wt. % aluminum, and the titanium alloy comprises at least some $Ti_3Al$.

8. The method of claim 1, wherein the titanium alloy is a Ti-6Al-4V alloy.

9. The method of claim 4, wherein the contacting step comprises applying sufficient force to the metal shaped-preform via the forging die to realize a true strain of from 0.05 to 1.10 in the metal shaped-preform.

10. The method of claim 1 comprising,
    after the forging step (b), annealing the final forged product.

11. The method of claim 10, wherein at least one of the first material, the second material, or the building substrate of the metal shaped-preform comprises a Ti-6Al-4V alloy, and wherein the annealing step comprises heating the final forged product to a temperature of from 640° C. to 816° C.

12. The method of claim 11, wherein the annealing step comprises heating the final forged product to a temperature of from 670° C. to 750° C.

13. The method of claim 1, comprising:
    prior to the using step, designing the shape of the building substrate such that, after the forging step, the building substrate is located in a predetermined area of low strain of the final forged product.

* * * * *